219-121.

SR 12-07-71 OR 3,626,141

United States Patent [11] 3,626,141

[72] Inventor Richard T. Daly
Huntington, N.Y.

[21] Appl. No. 33,245
[22] Filed Apr. 30, 1970
[45] Patented Dec. 7, 1971
[73] Assignee Quantronix Corporation
Farmingdale, N.Y.

[54] LASER SCRIBING APPARATUS

7 Claims, 6 Drawing Figs.

[52] U.S. Cl. 219/121 L
[51] Int. Cl. B23k 9/00
[50] Field of Search 219/121 L, 121 EB; 331/94.5

[56] References Cited

UNITED STATES PATENTS

| | | | |
|---|---|---|---|
| 3,171,943 | 3/1965 | Niedzielski | 219/121 |
| 3,281,712 | 10/1966 | Koester | 331/94.5 |
| 3,396,401 | 8/1968 | Nonomura | 346/1 |
| 3,410,203 | 11/1968 | Fischbeck | 101/1 |

*Primary Examiner*—J. V. Truhe
*Assistant Examiner*—Lawrence A. Rouse
*Attorney*—Darby & Darby

ABSTRACT: Apparatus for scribing semiconductor wafers including a laser, focusing optics and a drive mechanism for moving the focal spot of the laser beam along a prescribed path on the surface of a semiconductor wafer. Globules of material ejected from the wafer by the action of the laser beam are prevented from falling back upon the surface of the semiconductor wafer or from depositing on the focusing optics by a vacuum device which draws in air from the region of the focal spot together with entrained globules of semiconductor material, or by a transparent film disposed parallel to and slightly spaced apart from the surface of the semiconductor wafer to catch the molten globules of semiconductor material, or by coating the semiconductor wafer with a substance which prevents the ejected globules from sticking.

INVENTOR.
RICHARD T. DALY

BY Daly & Daly

ATTORNEYS

INVENTOR.
RICHARD T. DALY

BY Darby & Darby

ATTORNEYS

INVENTOR.
RICHARD T. DALY
BY Darby & Darby
ATTORNEYS

LASER SCRIBING APPARATUS

This invention relates to laser-scribing apparatus, and more particularly to laser apparatus for scribing semiconductor wafers.

In the manufacture of most semiconductor devices such as diodes, transistors, integrated circuits, etc., large numbers of individual devices are formed on a single semiconductor wafter. Semiconductor wafers are typically circular in shape, from 1 to 3 inches in diameter and from 5 to 12 mils thick.

A single semiconductor wafer may carry more than 10 1000 individual semiconductor devices. The semiconductor devices on a single wafer are generally identical to each other and are laid out in a gridlike pattern in which the individual semiconductor devices are separated by "streets" of the semiconductor base material. The individual semiconductor devices are generally fully operative, and in many cases are electrically tested in situ before the semiconductor wafer is divided into separate individual devices variously called "chips" or "pellets" or "dice."

One method which is used to divide a semiconductor wafter into separate "chips" is to score the semiconductor wafer with a diamond point along the "streets" between the individual devices, and then roll the semiconductor wafer over an edge, or a rod, so that it cracks along the score marks. This is very similar to the method used to cut window glass.

A disadvantage of this "score and crack" method of dividing a semiconductor wafer into individual "chips" is that the cracks may tend to wander, thus cutting through and destroying otherwise serviceable individual devices more or less at random.

A second method which is used to divide the semiconductor wafers into separate "chips" involves sawing the semiconductor wafer along the "streets" between the individual devices. The sawing operation may be accomplished by thin abrasively loaded saw blades, fine wires, thin disks, vibrating blades, or by an ultrasonically driven abrasive slurry. Although the sawing method does not have the disadvantage of crack wandering, it does entail high kerf loss. Because of the high kerf loss, the "streets" between the individual semiconductor devices must be made wider to allow for the material removed by the sawing process, with the result that fewer individual devices can be made on a single semiconductor wafer. In addition, the individual devices may be damaged by the abrasive material.

It is therefore an object of this invention to provide improved apparatus for dividing semiconductor wafers into separate "chips."

More particularly, it is an object of this invention to provide apparatus for scribing semiconductor wafers so that they may be divided into separate "chips" substantially without damage from wandering cracks.

It is also an object of this invention to provide apparatus for scribing semiconductor wafers with low kerf loss.

According to the above and other objects, the present invention provides apparatus for scribing semiconductor wafers including a laser device for producing laser pulses of sufficient energy to vaporize small holes in the semiconductor wafer, focusing optics for focusing the laser pulses at, or just below, the surface of the water to be scribed, a drive mechanism for moving the focal spot of the laser beam along a predetermined path on the surface of the semiconductor wafer so as to cut a deep, but narrow, trench in the wafer, and a device for preventing molten globules of semiconductor material from falling back upon the surface of the semiconductor wafer.

Other objects and advantages of the laser scribing apparatus of the present invention will be apparent from the following detailed description and accompanying drawings which set forth, by way of example, the principle of the present invention and the best mode contemplated of carrying out that principle.

Figure 1:
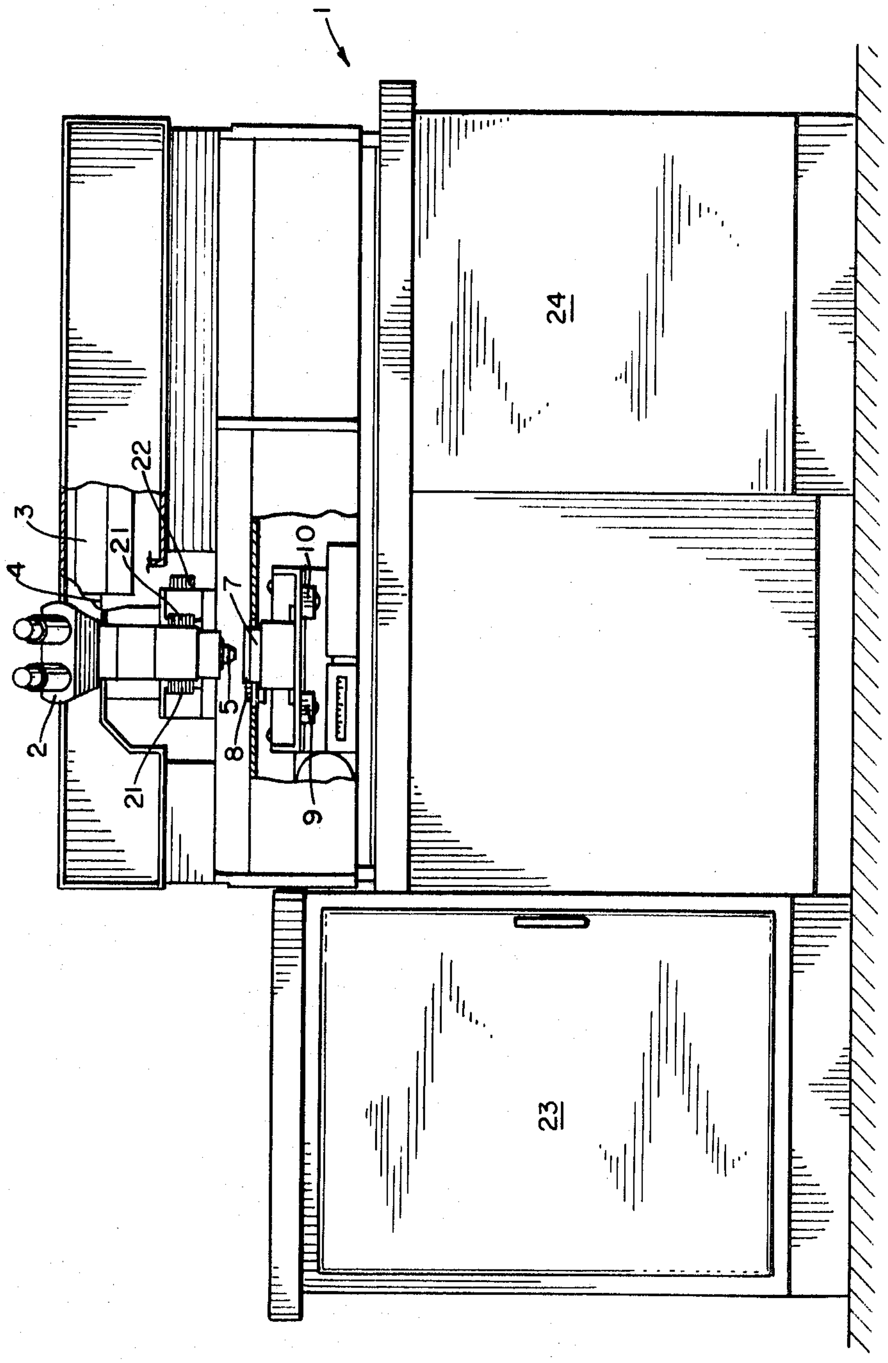
FIG. 1 is a front elevational view of the laser-scribing apparatus of the present invention, partially broken away to show portions of the device for holding the object to be scribed.

Before describing in detail the preferred embodiment of the present invention, it will be useful to explain, in general some of the factors involved in the cutting of materials by a laser beam. It is well known that a pulse of laser radiation of, for example, $10^{-3}$ joules, focused to a small spot of, for example, 10–20 microns, it will provide sufficient heating to vaporize or blast a hole in most materials. A laser beam can, under certain circumstances, be focused to a spot having a diameter, $d$, approximately equal to $f\lambda$ where $f$ is the working "$f$-number" of the laser focusing lens and $\lambda$ is the wavelength of the laser beam. Under these conditions, the depth of field, D, over which the size of the focal spot is within 10 percent of its minimum value is approximately $d^2/4\lambda$. Hence, a pulse of laser radiation, if focused to a small spot at or just below the surface of an object, such as a semiconductor wafer, can be made to create a hole having a depth which is several times the diameter of the focal spot. A succession of overlapping holes can be made in order to form a trench or kerf. Using a properly chosen laser, kerfs of up to 10 mils deep and less than 1 mil in width can be produced in a semiconductor wafer, such as a silicon wafer, at a linear speed of several inches per second, thus performing the function of a saw or a very deep scriber.

In the referred form of the present laser-scribing apparatus, a Neodymium-doped Yttrium-aluminum-Garnet (Nd:YAG) solid-state laser is used to form a trench or kerf in a silicon wafer. The wavelength of the Nd:YAG laser is 1.06 microns or $4.2\times10^{-5}$ inches expressed in English units. Therefore, in order to produce a focused spot 1 mil (0.001 inch) in diameter, a lens system having a working $f$ number of $f/24$ is required. This $f$-number is large enough to permit the use of the most elementary lens system. The depth of field will be plus or minus 6 mils which equals or exceeds the largest thickness of a typical silicon wafer.

The efficiency which a laser pulse is able to drill a hole in a particular material depends, in part, upon the degree to which the laser radiation is absorbed by the material. The intrinsic structure of the electronic levels of silicon is such that radiation of wavelengths somewhat shorter than 1 micron is very strongly absorbed. On the other hand, radiation of wavelengths longer than 1 micron is relatively weakly absorbed. Thus, the 1.06 micron wavelength of the Nd:YAG laser falls just at the "edge" of the absorption band of silicon. More particularly, at room temperature, silicon will absorb only 4 percent of the incident Nd:YAG laser radiation per mil of thickness.

If this situation were stable, the Nd:YAG laser would be relatively ineffective in heating and vaporizing silicon. However, the wavelength of the "edge" of the silicon absorption band is strong function of temperature. As temperature rises, due to initial heating by the laser beam, silicon becomes a strong absorber of the 1.06 micron wavelength radiation produced by the Nd:YAG laser, thus providing an efficient kerf forming operation.

Although it is theoretically possible to create the entire kerf grid with one laser pulse, to do so would require a very large and costly laser operating on a low duty cycle. The preferred form of the present invention uses the more economical technique of forming the kerf by sequentially "blasting" a series of small overlapping holes along each "street" between the individual semiconductor devices on the wafer. The pulsed mode operation of the laser minimizes the heating of, and possible resulting damage to the adjacent semiconductor devices.

In forming a kerf by successive overlapping holes, sufficient overlap must be provided to overcome the "back filling" which occurs as a result of the condensation of the vaporized semiconductor material on the walls of the kerf. In this regard, it is helpful to use a laser focal spot which is somewhat elongated in the direction of the cut.

Referring now to FIG. 1 of the drawings, there is shown a front elevational view of a preferred form of the laser-scribing apparatus of the present invention, partially broken away to show the laser device and the mechanism for adjusting the position of the wafer-holding chuck. The laser scribing apparatus generally designated 1 includes an operator's console which is equipped with a binocular microscope 2 to aid in setting up and aligning the apparatus prior to the start of a scribing operation, and to permit observation of the work in progress. The laser device 3 is preferably located with the operator's console, and the laser beam 4 is deflected, preferably by means of suitable prisms, not shown, through the focusing lens 5 to the workpiece 6 which may be a silicon wafer for purposes of illustration.

Although the principal application contemplated for the laser-scribing apparatus of the present invention is the scribing or cutting of semiconductor wafers, particularly silicon wafers, it will be appreciated by those skilled in the art that the laser-scribing apparatus of the present invention may be used to cut or scribed other objects or materials.

The workpiece 6 is preferably held in position for scribing by a vacuum chuck 7. It will be appreciated, however, that other types of article-holding devices may be used within the spirit and scope of the present invention.

The knob 8 controls the rotation of the vacuum chuck 7 so as to permit precise alignment of the "streets" on the semiconductor wafer 6 with the $x$ and $y$ directions of travel of the laser focal spot relative to the surface of the wafer 6. The $x$ and $y$ positions of the wafer holding vacuum chuck 7 may be manually controlled by the knobs 9 and 10.

The focusing of the binocular microscope 2 is controlled by focusing knobs 21. The focusing of the microscope 2 also serves to focus the laser beam on the surface of the wafer 6 because the microscope 2 and the laser 3 share the same focusing lens 5. The knob 22 provides fine adjustment of the position of the laser focal spot along the $x$ axis of movement.

The cabinets 23 and 24 contain various components of the laser-scribing apparatus including the laser power supply, laser cooling unit and a control logic unit.

Figure 2:
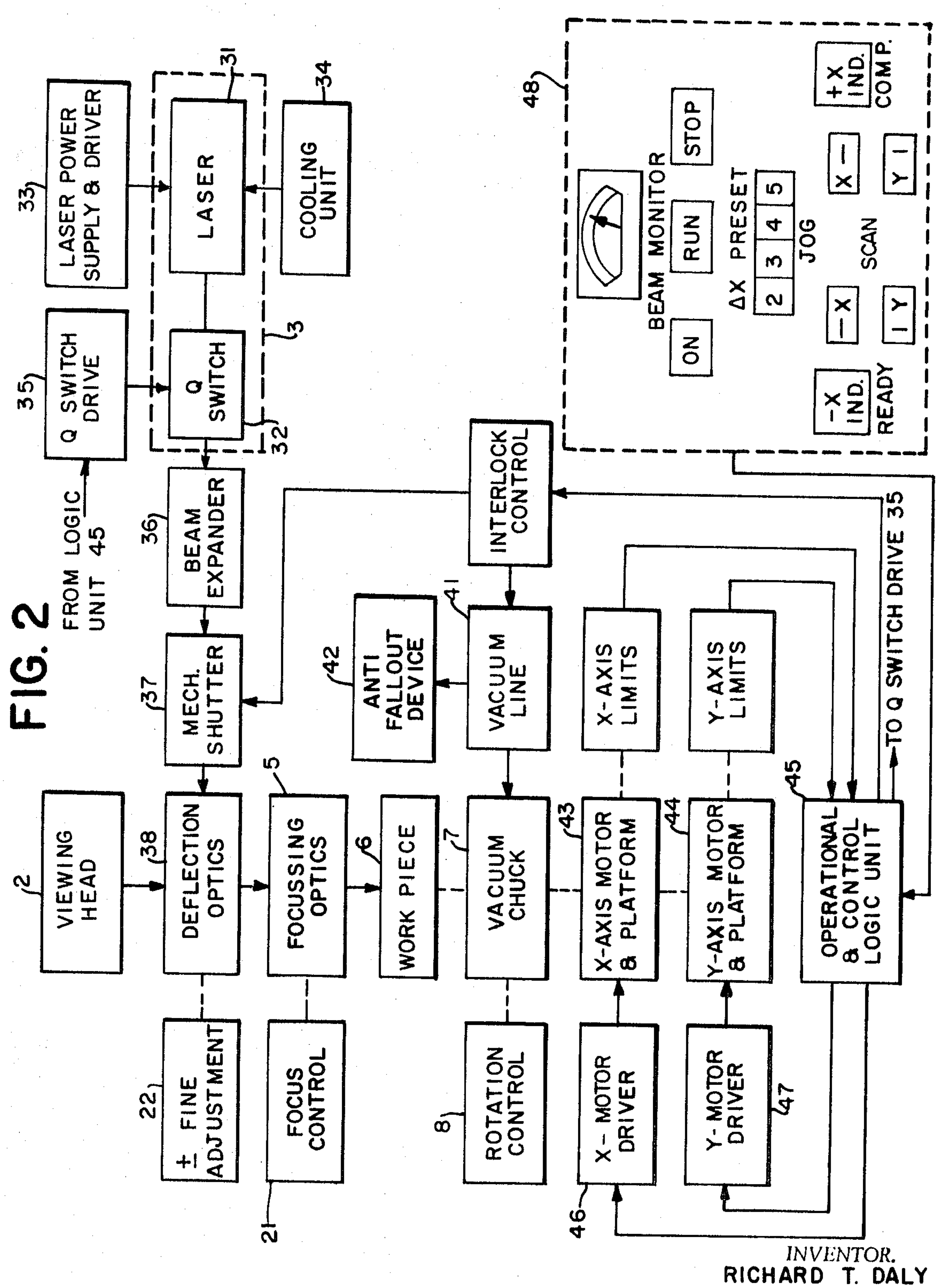
FIG. 2 is a block diagram showing the operational relationship of the major elements of the laser-scribing apparatus of the present invention.

Referring now to FIG. 2 of the drawings, there is shown a block diagram of the major elements of the laser scribing apparatus of the present invention. The laser device 3 includes a laser 31, which is preferably an optically pumped Nd:YAG solid state laser 31, and a Q-switch 32 to provide pulsed mode operation. The laser 31 includes a "chocking" aperture which forces the laser to operate in its fundamental (highest brightness) mode. The Q-switch 32 causes the laser device 3 to emit a high-frequency train of narrow intense pulses. For example, the frequency of the pulse train may be on the order of 2–5 kHz., and the pulse width may be on the order of 0.5 microseconds. The entire laser device 3 may be of a type well known to those skilled in the art such as, for example, the Model 112 laser transmitter manufactured by the Quantronix Corporation of 225 Engineers Road, Smithtown, New York.

The laser 31 is driven by the laser power supply and driver 33 which may be simply a line regulation transformer to power the 110-volt incandescent lamps to pump the Nd:YAG laser rod.

Cooling of the laser 31 is provided by the cooling unit 34, which may be of a type well known to those skilled in the art. For example, the cooling unit 34 may include a coolant water circulator and heat interchanger to cool the YAG laser rod and pump lamp reflectors, and a forced air blower to cool the incandescent pump lamp envelopes.

The Q-switch 32 is driven by the Q-switch driver 35 which may be of a type well known to those skilled in the art such as, for example, the Model 301 Q-switch driver manufactured by the Quantronix Corporation.

The output laser beam from the laser device 3 passes through the beam expander 36, which may be, for example, a three-power beam expander. After passing through the beam expander 36, the laser beam passes through a mechanical shutter device 37, the operation of which will be explained in greater detail hereinafter. From the mechanical shutter 37 the laser beam passes through deflection optics 38 and focusing optics 5 to impinge on the workpiece 6 which is, for purposes of illustration, a silicon wafer. The focusing optics 5 are controlled by the focus control 21. The viewing head 2 provides a microscopic view of the work area for initial alignment and in-process monitoring. The viewing system shares the focusing optics 5 with the laser beam. This dual function can be accommodated by a single set of focusing optics 5 by the use of a dichroic beam splitter which separates the laser radiation from the visible spectrum. The wavelength of the Nd:YAG laser is 1.06 microns and the visible spectrum is from 0.6 to 0.4 microns.

The workpiece 6 is held in position by a vacuum chuck 7 which is fed by a vacuum line 41. The vacuum line 41 is also connected to the antifallout device 42 which prevents the globules of molten silicon ejected from the workpiece 6 by the action of the laser beam from falling back upon the surface of the workpiece 6 and damaging the semiconductor devices formed thereon.

Rotational alignment of the workpiece 6 is accomplished by the rotation control 8 which is mechanically connected to the vacuum chuck 7. Movement of the workpiece 6 in the $x$ and $y$ directions is accomplished by the $x$-axis motor and platform 43 and $y$-axis motor and platform 44. The operation of the $x$-axis motor is controlled by the operational and control logic unit 45 through the $x$-motor driver 46. The operation of the $y$-axis motor is controlled by the operational control and logic unit 45 through the $y$-motor driver 47.

The motion of the workpiece 6 relative to the focal spot of the laser beam must be precise so that the focal spot of the laser beam will cut safely down the center of the "streets" between the semiconductor devices formed on the wafer. The "streets" are typically on the order of 2–10 mils wide. Therefore, a tolerance on the order of 0.1 mils should preferably be maintained over a distance of 2 or 3 inches which is the length of the required cut across the workpiece 6. Moreover, after the laser beam has completed cutting down one "street," the workpiece 6 must be indexed laterally relative to the focal spot of the laser beam by exactly the center-to-center spacing of the "streets" in order to commence the next cut. The indexing operation must be sufficiently precise that the error accumulated in indexing across the width of the wafer will not exceed approximately 0.5 mil.

Precision movement of the workpiece 6 is accomplished by orthogonal precision slides. One precision slide, the $x$-axis platform 43, rides on the other precision slide, the $y$-axis platform 44. The $x$-axis and $y$-axis motors may be digital stepping motors or analog continuous motion motors with feedback from a position sensor. Both types of motors are well known to those skilled in the art. Fine adjustment of the $x$ position of the focal spot relative to the workpiece is provided by the fine adjustment control 22 which is mechanically connected to the deflection optics 38.

The operational and control logic unit 45 supplies control signals to the *x*-motor driver 46 and *y*-motor driver 47 in accordance with the values entered by the operator on the control panel 48. After the workpiece 6 is aligned, the operator initiates the scribing operation by pressing the "run" button on the control panel 48. This causes the operational and control logic unit 45 to initially drive the *x*-axis platform 43 and the *y*-axis platform 44 to their predetermined "starting points." The operational and control logic unit 45 then causes the workpiece 6 to move uniformly along one axis of motion, such as, for example, the direction, until the *y*-axis platform 44 reaches the *y*-axis limit 51. The operational and control logic unit 45 then causes the *x*-axis motor and platform 43 to index along the *x* axis by the amount entered by the operator on control board 48. Logic unit 45 then causes the *y*-axis motor and platform 44 to move uniformly in the *y* direction until the opposite *y*-axis limit is reached. This procedure is followed until all the *y* streets have been traversed by the laser focal spot. The logic unit 45 then causes the workpiece 6 to move so that the laser focal spot moves uniformly along the *x* streets between the *x*-axis limits 52, indexing in the *y* direction until all the *x* streets have been traversed by the laser focal spot.

The interlock control 53 prevents operation of the apparatus in the event that the vacuum line 41 is not operative. If the vacuum line 41 is not operative the interlock control 53 causes the mechanical shutter 37 to close, thus preventing the laser beam from passing through to the deflection optics 38 and focusing optics 5. When the vacuum line 41 is operative and the "run" button on the control panel 48 is pressed, the logic unit 45 causes the interlock control 53 to open mechanical shutter 37 thus allowing the laser beam to impinge upon the workpiece 6.

Figures 3, 4, 5:
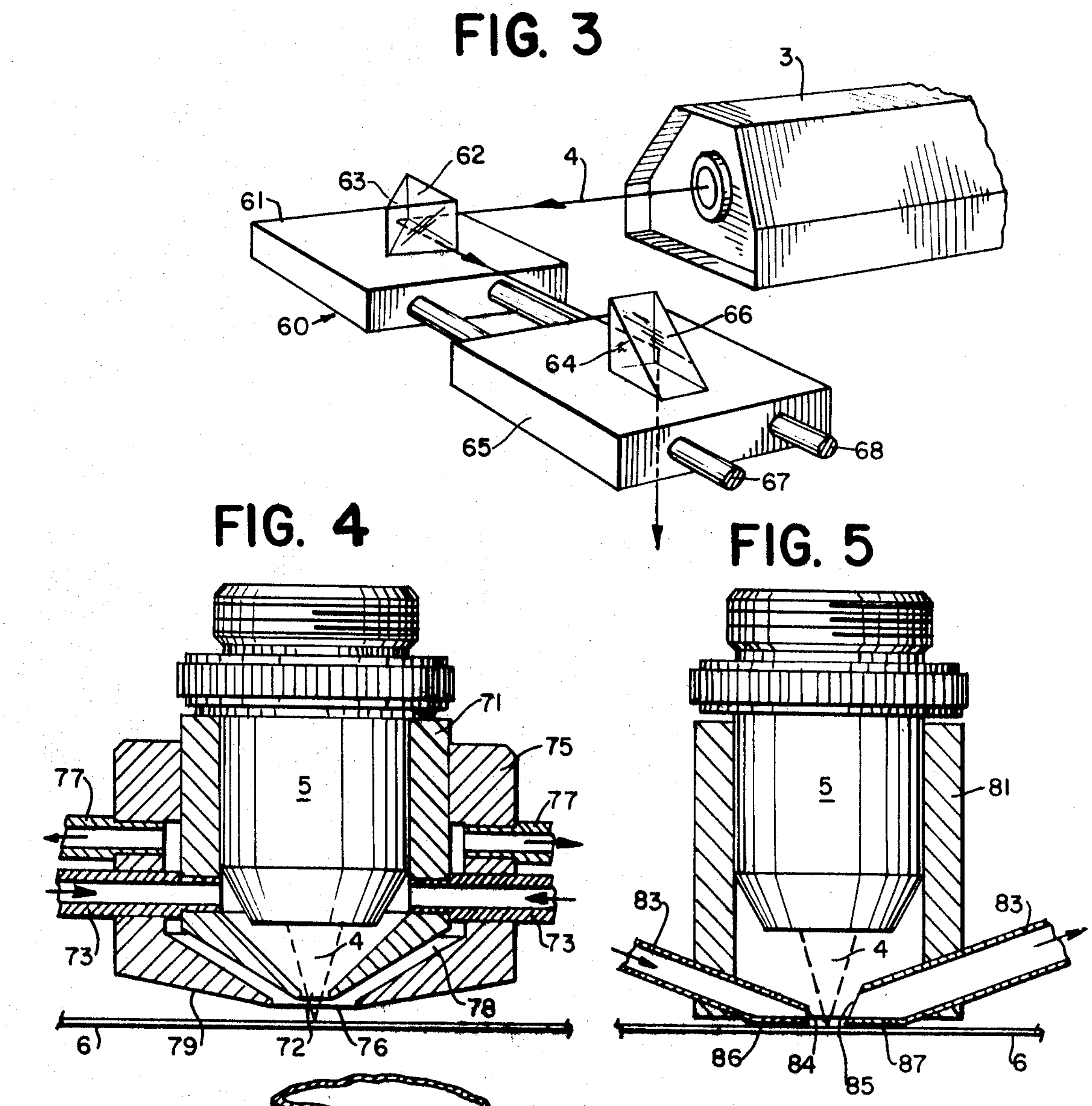
FIG. 3 is a perspective view, in somewhat schematic form, of a laser device and a device for deflecting the laser beam to a predetermined spot on the surface of the object to be scribed.
FIG. 4 is a detailed cross-sectional view of a device using a vacuum in combination with gas under pressure in order to prevent globules of material from falling back upon the surface of the object to be scribed or from depositing on the focusing lens.
FIG. 5 is a detailed cross-sectional view of a second device using a vacuum in combination with a gas under pressure in order to prevent globules of material from falling back upon the surface of the object to be scribed or from depositing on the focusing lens.

Referring now to FIG. 3 of the drawings, there is shown a perspective view, in somewhat schematic form, of a laser device 3 and a device, generally designated 60, for deflecting the laser beam 4. The deflection device 60 includes a first support member 61 which carries a first prism 62. The prism 62 is mounted so that its rear face 63 is disposed at an angle of substantially 45° to the laser beam 4 so as to totally reflect the laser beam through an angle of approximately 90°. The reflected laser beam impinges on a second prism 64 which is carried by a second support member 65. The rear face 66 of prism 64 is disposed at an angle of substantially 45° to the laser beam so as to totally reflect the laser beam through an angle of approximately 90° as shown. The support member 65 is movably mounted on a pair of parallel guide rods 67 and 68. The movement of support member 65 along guide rods 67 and 68 may be accomplished by any of a number of suitable precision mechanisms know to those skilled in the art. For example, the movement of support member 65 might be controlled by a worm gear arrangement operated by the control knob 22 shown in FIG. 1.

Referring now to FIG. 4 of the drawings there is shown a detailed cross-sectional view of a device for removing molten globules of semiconductor material which are ejected from the wafer 6 by the action of the laser beam 4 so as to prevent them from falling back upon the surface of the wafer 6 and to prevent their depositing on the focusing lens surface. The globule-removing device includes a first shroud 71 which surrounds and is attached to the focusing optics 5 of the laser-scribing apparatus. The lower end of the shroud 71 tapers inward to a central aperture 72 which allows the laser beam 4 to pass through to the surface of the workpiece 6. The aperture 72 is sufficiently large to provide clearance for the focal cone of the laser beam 4. The interior of shroud 71 is vented to the atmosphere thru inlets 73.

A second shroud 75 surrounds shroud 71. Shroud 75 tapers inward at its lower end to a central aperture 76 which permits the laser beam 4 to pass through to the workpiece 6. The aperture 76 is preferably somewhat larger than the aperture 72 of shroud 71. The interior of shroud 71 is connected by conduits 77 to a suitable vacuum pump not shown. Hence, the gas flows upward through the aperture 76 in shroud 75, upward through the interior 78 of shroud 75 and out through conduits 77. Furthermore, due to the lowered pressure in the region of orifice 76, air is drawn through vents 73, downward through 72, thence through 78 to vacuum pumps. The downward flow of air through orifice 72 prevents globules from passing through 72 and striking surface of lens assembly 5. The inward and upward flow of gas in the region of aperture 76 captures, or entrains, the globules of molten material ejected from the surface of semiconductor wafer 6 by the action of the laser beam 4 and removes them from the operating area, thus preventing them from falling back to the surface of the semiconductor wafer with the attendant risk of damage to the semiconductor devices formed thereon. The lower surface 79 of shroud 75 is shaped so that the cross section formed between it and the semiconductor surface 6 permits a smooth subsonic air flow with no transitions to supersonic flow.

Referring now to FIG. 5 f the drawings, there is shown a detailed cross-sectional view of another alternative device for removing ejected globules of molten semiconductor material from the area of operation. The device of FIG. 5 includes a cylindrical shroud 81 which surrounds and is attached to the focusing optics 5 of the laser scribing apparatus. A conduit 82 extends through the wall of shroud 81 to the neighborhood of the focal spot of the laser beam 4. A second conduit 83 extends through the opposite sidewall of shroud 81 to the opposite side of the laser focal spot. Conduit 82 is connected to a source of gas under pressure and conduit 83 is connected to a vacuum pump. Conduit 82 is provided with a nozzle 84 to direct the gas across the region of the laser focal spot. The opening 85 in the end of vacuum conduit 83 is substantially larger than the nozzle 84 in order to pull in the gas stream of nozzle 84 with its entrained globules of ejected molten material. The lower surfaces 86 and 87 of conduits 82 and 83 are disposed as close to the surface of the semiconductor wafer 6 as is feasible without substantial risk of damage to the semiconductor devices formed thereon.

Figure 6:
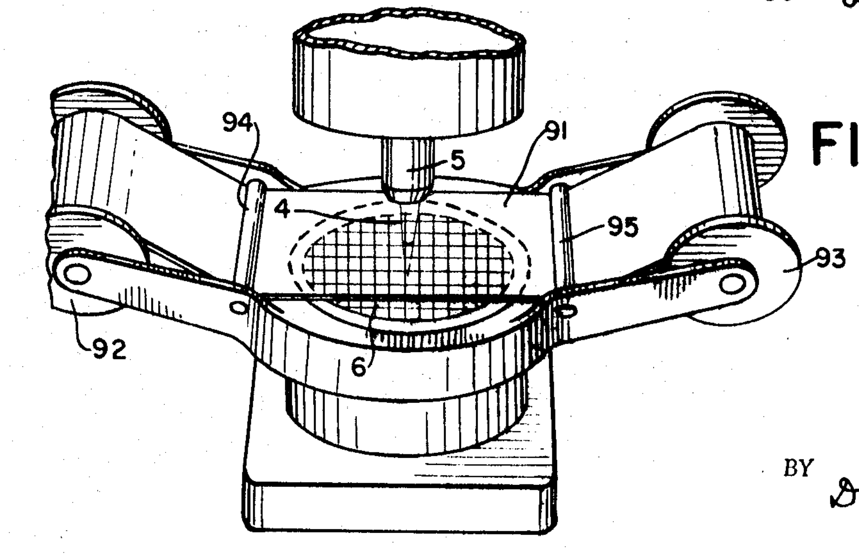
FIG. 6 is a perspective view of the laser focusing optics, the wafer to be scribed and apparatus for transporting a transparent plastic film over the surface of the wafer to catch molten globules ejected from the wafer by the action of the laser beam and to prevent them from falling back on the surface of the wafer.

Referring now to FIG. 6 of the drawings, there is shown a perspective view of the laser focusing optics 5, the semiconductor wafer 6 and apparatus for transporting a plastic film 91 over the surface of the wafer 6 to catch the molten globules ejected from the surface of the wafer 6 by the action of the laser beam 4. The molten globules adhere to the plastic film 91 and are thus prevented from falling back upon the surface of the wafer 6 with attendant risk of damage to the semiconductor wafers formed thereon. The apparatus for transporting the plastic film 91 includes a feed roll 92, a takeup roll 93 and a pair of guide rollers 94 and 95. The plastic film 91 is transparent to radiation of the wavelength of the laser beam 4 in order to avoid absorbing heat from the laser beam which might cause the film to melt. The film 91 may be made of any of a number of materials well known to those skilled in the art such as, for example, a polyethylene terephthalate film or vinylidene chloride copolymer film.

Another technique for preventing damage to the semiconductor devices by the molten globules of material ejected from the wafer by the action of the laser beam is to coat the surface of the wafer, including the semiconductor devices, with a substance which will prevent the globules from sticking to the surface of the wafer when they fall back upon it. For example, the surface of the wafer might be coated with a heavy fluorocarbon such as fluorochloromethane or ethane. The inert coating substance should be readily removably by a solvent or by evaporation in a warm air stream. For example, a Freon coating might be removed together with embedded particles, by warming to the boiling point while gently blowing across the surface of the wafer with clean dry air.

While the principle of the present invention has been illustrated by reference to a preferred embodiment and several modifications thereof, it will be appreciated by those skilled in the art that other modifications and adaptations of the present laser scribing apparatus may be made without departing from the spirit and scope of the invention as set forth with particularity in the attendant claims.

What is claimed is:

1. Scribing apparatus comprising:
means for holding an object to be scribed;
a laser device for producing a laser beam of sufficient energy to vaporize a portion of the object to be scribed;
means for focusing said laser beam from said laser device on said object to be scribed;
drive means for moving said focusing means relative to said object-holding means to cause the focal spot of said laser beam to describe a continuous line on the surface of said object to be scribed;
means for directing a stream of gas into the region of said focal spot of said laser beam; and
a vacuum inlet disposed adjacent the region of said focal spot of said laser beam for withdrawing gas from the region of said focal spot together with entrained globules of material ejected from said object to be scribed by the action of said laser beam.

2. The apparatus of claim 1, wherein said means for directing a stream of gas comprises a first cylindrical shroud surrounding the region of said focal spot of said laser beam; and
wherein said vacuum inlet comprises a second cylindrical shroud surrounding said first cylindrical shroud for withdrawing gas from the region of said focal spot on said laser beam with entrained globules of material ejected from the surface of said object to be scribed by the action of said laser beam 3. The scribing apparatus of claim 2, wherein the mouth of said second shroud is disposed substantially closer to the surface of said object to be scribed than the mouth of said first shroud.

4. The scribing apparatus of claim 1 wherein said focusing means produces a focal spot which is elongated in the direction of motion of said focal spot relative to said object to be scribed.

5. The scribing apparatus of claim 1 wherein said laser device comprises a Q-switched laser.

6. The scribing apparatus of claim 1 wherein said drive means moves said focusing means relative to said object-holding means at a rate so that the output pulses from said laser device will make a series of overlapping holes in said object to be scribed.

7. Scribing apparatus comprising:
means for holding an object to be scribed;
a laser device for producing a laser beam of sufficient energy to vaporize a portion of the object to be scribed;
means for focusing said laser beam from said laser device on said object to be scribed;
drive means for moving said focusing means relative to said object-holding means to cause the focal spot of said laser beam to describe a continuous line on the surface of said object to be scribed;
a shroud surrounding the region of said focal spot of said laser beam; and
a vacuum inlet connected to the interior of said shroud for withdrawing air from the region of said focal spot of said laser beam with entrained globules of material ejected from said object to be scribed by the action of said laser beam.

* * * * *